(12) United States Patent
Bischof et al.

(10) Patent No.: US 8,237,316 B2
(45) Date of Patent: Aug. 7, 2012

(54) STATOR FOR ELECTROMOTOR OR GENERATOR

(75) Inventors: Thomas Bischof, Illerbeuren (DE); Sandra Stehmer née Maier, Bad Wurzach (DE); Oliver Kämpfer, Memmingen (DE)

(73) Assignee: SycoTec GmbH & Co. KG, Leutkirch im Allgäu (DE)

( * ) Notice: Subject to any disclaimer, the term of this patent is extended or adjusted under 35 U.S.C. 154(b) by 220 days.

(21) Appl. No.: 12/314,821

(22) Filed: Dec. 17, 2008

(65) Prior Publication Data

US 2009/0174267 A1 Jul. 9, 2009

(30) Foreign Application Priority Data

Dec. 20, 2007 (DE) .......................... 10 2007 062 540

(51) Int. Cl.
*H02K 9/06* (2006.01)
*H02K 9/00* (2006.01)
(52) U.S. Cl. ................. 310/52; 310/60 A; 310/216.034; 310/90
(58) Field of Classification Search .................... 310/62, 310/63, 52, 60 A, 216.012, 216.034, 90, 90.5; H02K 9/06, 9/00, 9/02, 9/04
See application file for complete search history.

(56) References Cited

U.S. PATENT DOCUMENTS

| | | | | | |
|---|---|---|---|---|---|
| 3,610,975 | A | * | 10/1971 | Onjanow | 310/63 |
| 3,684,906 | A | * | 8/1972 | Lenz | 310/61 |
| 4,156,822 | A | * | 5/1979 | Roddy et al. | 310/216.054 |
| 4,365,178 | A | * | 12/1982 | Lenz | 310/63 |
| 4,409,502 | A | * | 10/1983 | McCabria | 310/62 |
| 4,472,651 | A | * | 9/1984 | Jones | 310/216.054 |
| 6,713,927 | B2 | * | 3/2004 | Kikuchi et al. | 310/214 |
| 6,933,633 | B2 | * | 8/2005 | Kaneko et al. | 310/52 |

FOREIGN PATENT DOCUMENTS

| | | |
|---|---|---|
| DE | 26 28 334 | 1/1978 |
| DE | 196 21 058 | 11/1997 |
| DE | 197 49 316 | 5/1999 |
| DE | 197 50 064 | 5/1999 |
| DE | 100 52 426 | 5/2002 |
| DE | 101 15 186 | 10/2002 |
| DE | 10 2006 014 500 | 10/2007 |
| JP | 55144763 A * | 11/1980 |

OTHER PUBLICATIONS

German Search Report dated Aug. 22, 2008.

* cited by examiner

*Primary Examiner* — Quyen Leung
*Assistant Examiner* — Michael Andrews
(74) *Attorney, Agent, or Firm* — Jacobson Holman PLLC

(57) ABSTRACT

An electromotor or a generator for conveying gas and/or liquid media. The electromotor or the generator has a rotor with a rotor magnet. The rotor is surrounded by a stator. The stator has at least one stator groove limited by a stator tooth. At least a part of the stator groove serves as a medium passage opening.

17 Claims, 8 Drawing Sheets

Figure 1:
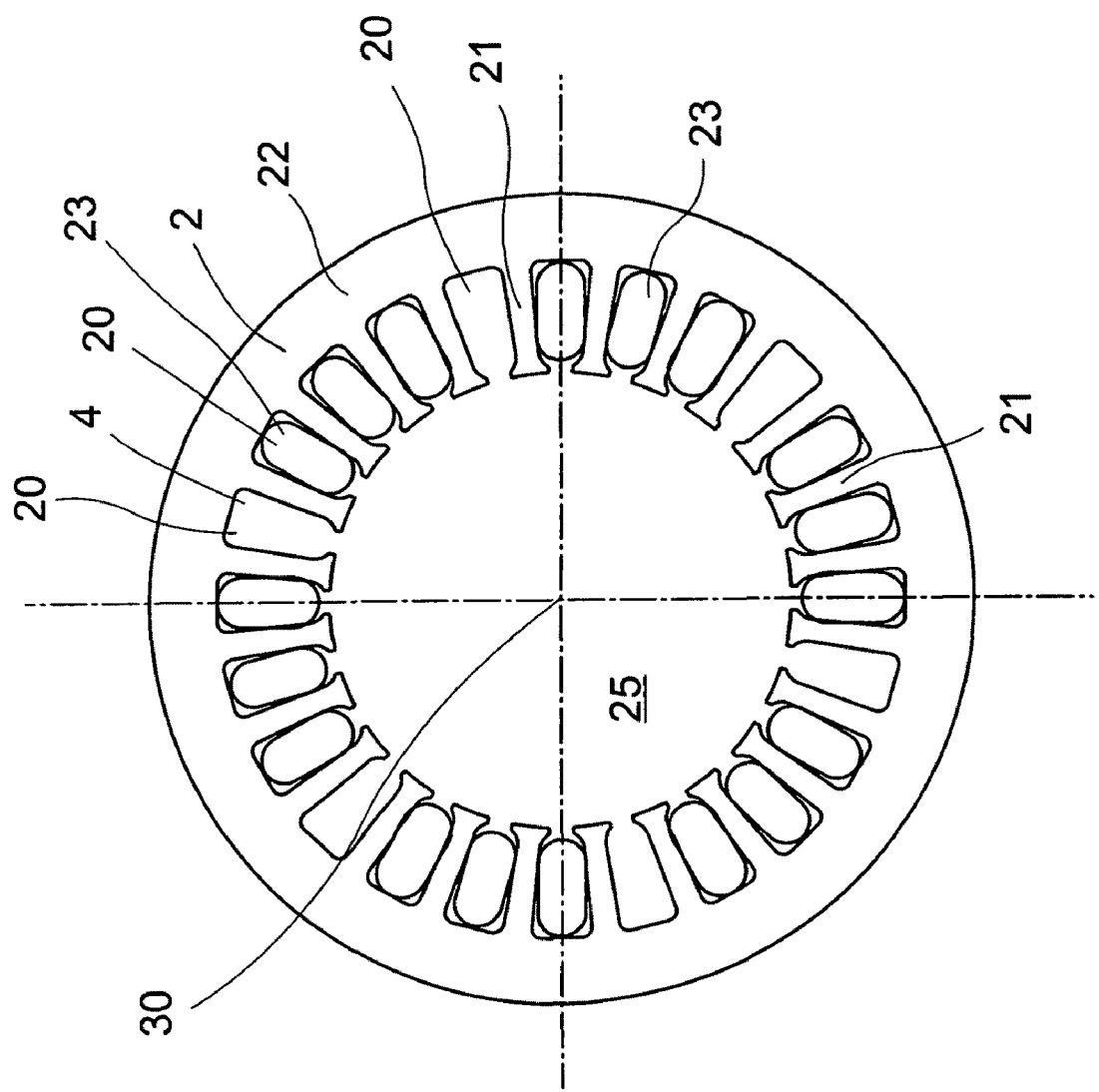

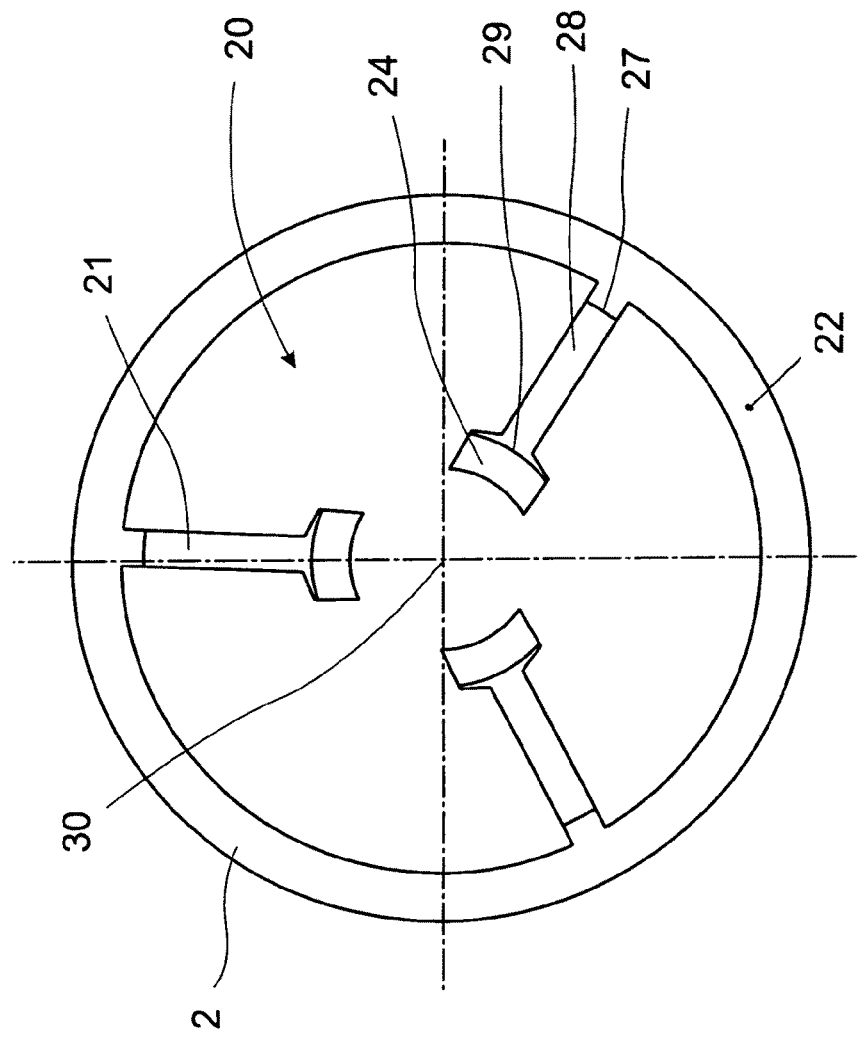
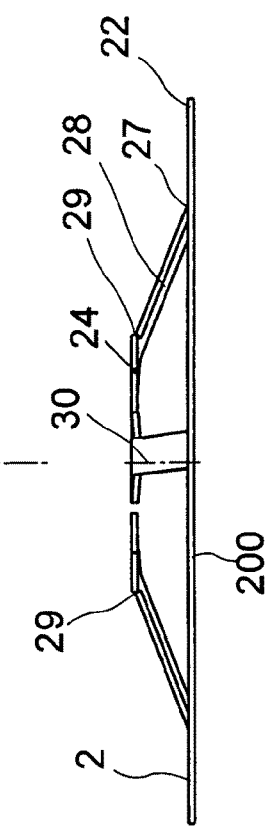
Fig. 4a
Fig. 4b

STATOR FOR ELECTROMOTOR OR GENERATOR

BACKGROUND OF THE INVENTION

The invention refers to an electromotor, in particular for conveying gaseous and/or liquid media, or a generator.

As it is known the principle of an electromotor and the principle of a generator are closely related. An electromotor turns electric energy into mechanical energy, a generator works vice versa and turns mechanical energy into electric energy.

The electromotor is employed, for example, as drive for conveying gaseous or liquid media, the generator is used because of the movement of gaseous or liquid media. As the way of functioning of these two appliances is very similar, the invention comprises both subjects, the application case of the electromotor being often described which can, however, also be transferred to the application case of a generator according to the invention, and thus this is also comprised and disclosed.

The electromotor or generator has a rotor as well as a stator surrounding the rotor. On the rotor a rotor magnet is provided, for example a permanent magnet.

Known electromotors or generators are realized in that way that a driving shaft projects out of a housing which then serves for connecting the conveying part or the turbine wheel and so on. The method requires the rotating shaft has to be sealed in order to prevent gaseous or liquid media from getting inside the electromotor or generator. The electromotor also has to be realized in a separate housing and thus separated from the other field of application which may be space consuming.

In the state of the art several solutions have become known which are supposed to improve an electromotor or generator in that respect that the cooling of the rotor or the stator should be improved. Thus, according to the state of the art, a multiple parallel conductor for windings of electrical appliances is equipped with at least one cooling channel for a coolant.

Another solution of the state of the art refers to a turbo generator having a sub groove in its conductive groove where a cooling gas flows which is supposed to cool the conductive rods from the inside.

Also for cooling a generator a solution is known where in the conductive winding at least one channel is provided which can be passed through by a fluid.

Furthermore a solution of the state of the art has become known where in the bottom of stator grooves cooling pipes are arranged.

Similar to the solution of the state of the art mentioned first with multiple parallel conductors another solution is known where the air channels are provided in the area of the winding, an air circulation being possible between the stator and the armature shaft.

Another solution of the state of the art is characterised in that a front-side supply of the coolant is carried out via at least one gas conduit ring integrated in the rotor which is supposed to provide also an improved cooling.

SUMMARY OF THE INVENTION

The present invention has the object of providing an arrangement or construction of the electromotor or generator as space saving as possible.

In order to solve this problem the invention comes from an electromotor or generator as described in the beginning, and suggests an electromotor, in particular for conveying gaseous media or a generator which can be put in the area directing the medium, and which has a rotor with a rotor magnet or short-circuit armature, and a stator surrounding the rotor, the stator has at least one stator groove limited at least by one stator tooth, and at least a part of the stator groove(s) serve(s) as medium passage opening for the medium to be conveyed.

Just in an application case where the electromotor has to move or accelerate a gaseous or liquid medium, or electricity is produced because of the movement of the medium through the generator, usually the structural parts in the passage channel of the medium are in the way. It is here known in the state of the art to pay attention to an air gap as small as possible between the rotor and the stator, and to realize a copper factor as high as possible in the stator, that means to achieve a high number of windings of the electromagnet or the coil in order to get high efficiency. The result in the state of the art is a rather close construction so that the drive area (for the electromotor as well as also for the generator) has been arranged on the shaft projecting from the motor or generator housing.

In contrast to this state of the art the invention suggests a completely different way. Consciously the copper factor, that means the share of the stator winding, in the electromotor or generator is reduced, so that the stator groove does not serve anymore only or exclusively for receiving the stator winding, but now additionally or exclusively is used as medium passage opening.

The suggestion according to the invention makes it now possible to integrate or also to realize the electromotor or the generator in the area guiding the medium, that is for example the channel system or hose and so on, so that a very space-saving construction can be realized. In the ideal case a separate housing for the electromotor or generator is not even necessary anymore as this is realized together by the channel walls and housings limiting the medium flow.

The invention comprises basically here two main ideas.

In an embodiment according to the invention only one stator tooth is provided at the stator. The resulting single stator groove serves at least partly as a medium passage opening. The rest receives the stator winding.

In another embodiment of the invention at the stator at least two stator teeth are provided. The resulting stator grooves serve at least partly as medium passage openings.

In another, often the more frequent, modification of realization of the invention the stator has a number of stator grooves, the different stator grooves also being used differently. In this example then for example some stator grooves are, as usually, fully filled with the stator winding and do not serve for the medium flow. Another group of stator grooves serves at least partly for the medium flow opening, that means the copper factor here is already reduced compared with the before-mentioned first group, but does not equal 0!

In a third modification it is provided that the actually known stator groove is used exclusively for the medium flow opening, that means it does not receive stator windings.

It is clear that a generator or electromotor according to the invention can have, of course, also mixed forms of the above-mentioned modifications according to the invention.

In another modification according to the invention it is provided that the end of the stator tooth facing inwards has a widening. This widening on the top effects a better distribution of the magnetic flow and reduces the magnetic bosh moment.

In another preferred modification of the invention it is provided that the stator tooth serves for bearing for the rotor. By means of this modification according to the invention a lot of space is saved, and the stator tooth (or several stator teeth) are used twice. It does not only serve for limiting the stator groove, but also forms a bearing for the rotor, for example a separate bearing being provided for that which is supported then via the stator tooth in the housing of the electromotor (which is, for example, identical with the line of the gaseous or liquid medium). The bearing can also be carried by the extrusion-coated or cast-in end windings (see FIG. 2).

Cleverly it is provided that the electromotor or the generator has two or more, in particular three or a multiple of three stator teeth arranged equidistantly in the direction of the circumference. By means of that in an easy way an effective bearing of the rotor is provided namely, when the stator teeth arranged equidistantly in the direction of circumference form at the same time also the bearing for the rotor or carry it. Through the equidistant arrangement also a symmetric arrangement is possible, sufficient space remaining for the medium flow between the stator teeth in the stator grooves. The result is a very space-saving arrangement of the electromotor or generator. It is clear that the number of stator teeth also determines the number of stator grooves. The number of stator grooves corresponds with the number of stator teeth. The design of the stator teeth is here, as a rule, similar in order to realize always the same magnetic qualities in the direction of circumference.

In a preferred modification of the invention it is provided that the sum of the angles at a circumference of the stator grooves is more than 300°, preferably more than 330°. According to the invention it is suggested that the stator is designed for the most part as stator grooves, and only a small part is realized as stator teeth, and, if a suitably small copper factor or a small number of stator windings are provided, the result is a very large medium passage opening.

Advantageously the stator is formed by several identical stator discs arranged one behind the other. The stator disc is, seen from above, designed, for example, annular, circular, oval, angled and so on. The stator discs consist here, for example, of a suitable stator metal sheet which has been stamped or re-formed shapingly. The construction of the stator of a number of stator discs makes it possible to realize even rather complex designs of the stator, for example in the arrangement of the stator teeth and the stator grooves in a simple way. The disc-like design of the stator also serves for suppressing eddy currents in the stator.

In a modification according to the invention it is provided that the stator tooth is angled in an axial direction. By the angling of the stator teeth an axial staggering between the rotor package and the stator back is possible. This can be reached, for example by accordingly angled stator discs (see FIG. 4b).

The result here is that the axial center of the stator and the axial center of the rotor, seen in an axial direction, are dislocated. There are also other suggestions for realizing that.

In a preferred modification of the invention it is provided that the electromotor or generator is characterised in that the bearing of the rotor is provided on an axial position within the stator winding. This results in a good co-operation of the magnetically active elements.

Cleverly it is provided that the rotor shaft carrying the rotor also has a medium conveying part, in particular a conveyor wheel, a propeller conveyor or a screw conveyor. By means of that a direct drive of the structural component accelerating the medium is achieved. In the same way also the generator has a part moved or driven by the medium flow. This can be, in an analogous way, a conveyor wheel, a propeller conveyor or even a screw conveyor which causes the rotor to rotate because of the movement of the medium.

In another modification of the invention it is provided that the medium conveying or medium driven part is provided at the freely projecting part of the rotor shaft. By means of that this part is slightly distanced from the magnetic active element, and the impairing influence is thus accordingly reduced which is convenient for the efficiency. In an analogous way it is, of course, also possible to provide the medium conveying or medium driven parts between two bearings of the rotor shaft and then to cancel an accordingly projecting part of the rotor shaft.

By means of an internally sheathed stator, as it is suggested in a modification according to the invention, it is possible to protect the stator winding accordingly. This is in particular an advantage if very aggressive media flow through the electromotor or generator.

The object defined according to the invention is solved by an electromotor or generator where the running on bearings of the rotor is provided at the level of the axial position of the stator winding. A local spacing known so far of the bearing of the rotor and the stator winding is consciously left out so that a very close and space-saving arrangement of the electromotor or generator is the result.

The electromotor according to the invention is employed in very different fields of application. It is employed, for example, in an electrically supported turbo super-charger or in a conveying device for transporting explosive gases, dusts, steams, liquids, food, pastes or for gluing materials. Preferably the electromotor according to the invention is provided for example also in ventilation devices or even in pumps, the invention being in particular suitable for pumps used for aggressive media such as for example sea water or chemical solutions and so on. The electromotor is also employed as a drive in dental or surgical apparatus as the motor can be flowed through by very different media and works here without any problems. According to the invention very space-saving electric drives can be realized which have a large field of application such as in the dental or surgical field.

Furthermore the electromotor according to the invention is employed also in disinfectable or sterilizable pumps, canned motor pumps, dosing pumps, micro pumps, one-way pumps or multi-stage pump systems, such as, for example also centrifugal pumps.

An essential advantage of the invention is in particular the fact that a transport of media in an axial direction (with reference to the rotor axis) is provided. Therefore the electromotor according to the invention is suited also for the employment as a drive of a conveying device directly in the conveying line, for example the line channel or a suitable housing, an additional housing and additionally required space for the electromotor can thus be prevented. Of course, the turbo super-charger designed according to the invention, conveying devices, pumps, ventilation devices designed according to the invention with a motor of this kind are characterized in that they have the motor in these apparatuses integrated and altogether need less space or are constructed more compact.

The concept according to the invention cannot only be realized as an electromotor but it can be also employed as a generator. The generator is here used, for example, in a turbine, in particular in a gas, water or steam turbine. Besides the generator according to the invention can also be used in devices for measuring medium flow, the generator voltage generated in the generator serving in particular for evaluating the medium flow.

The invention does here not only refer to the electromotor or the generator as described, or their advantageous employment in very different other devices or apparatus, but it also comprises just these devices and apparatus equipped with the electromotor or generator. By the use of the electromotor according to the invention also a turbo super-charger, a conveying device, a ventilation device or a pump is improved accordingly as the articles according to the invention equipped in this way require little space as the electric drive can already be integrated as an electromotor in the conveying circle and does not require additionally constructive space.

The same can also be achieved for a turbine or a device for medium flow measuring with the generator also suggested according to the invention.

BRIEF DESCRIPTION OF THE DIFFERENT VIEWS OF THE DRAWINGS

Figure 2:
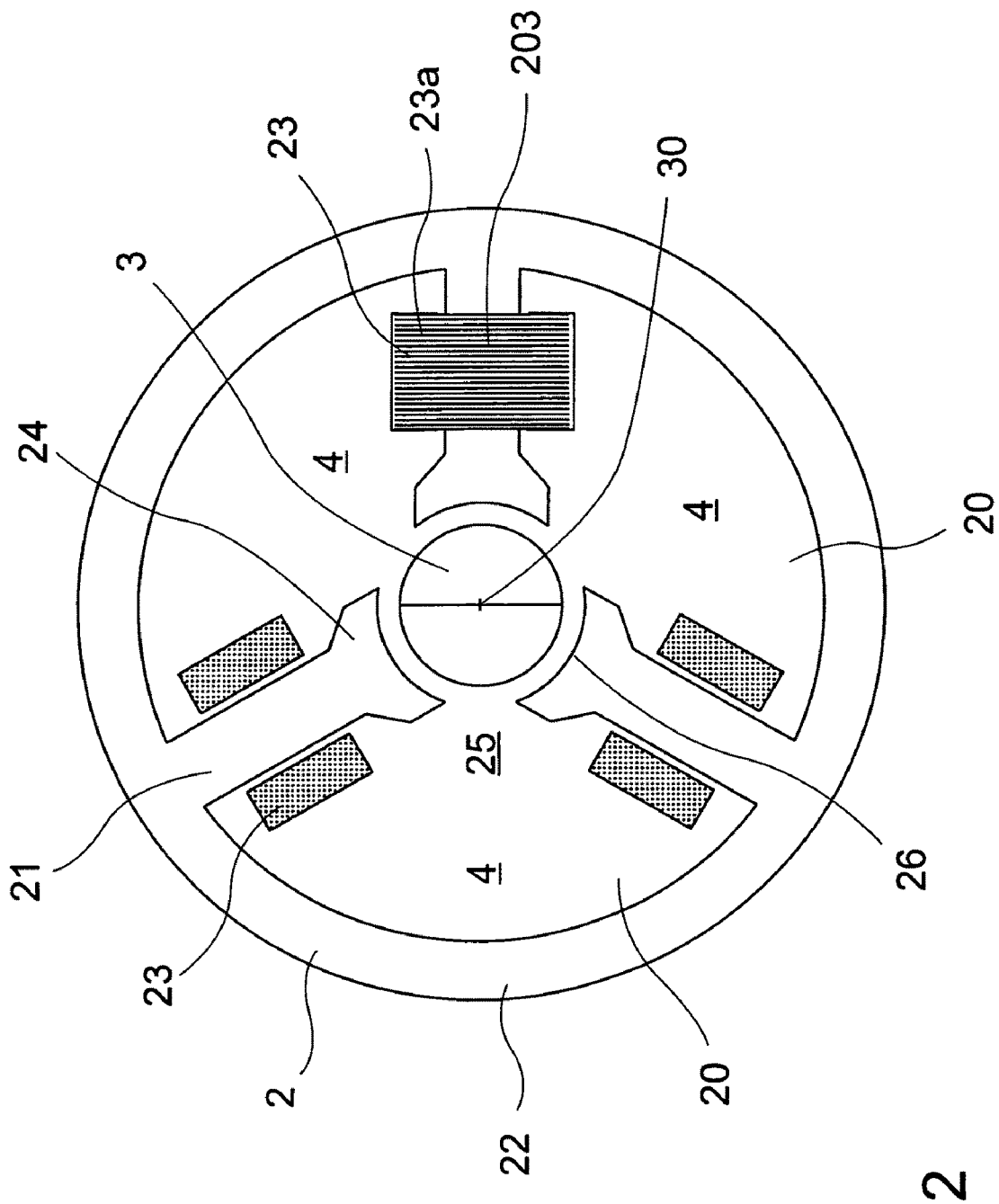
Figure 3:
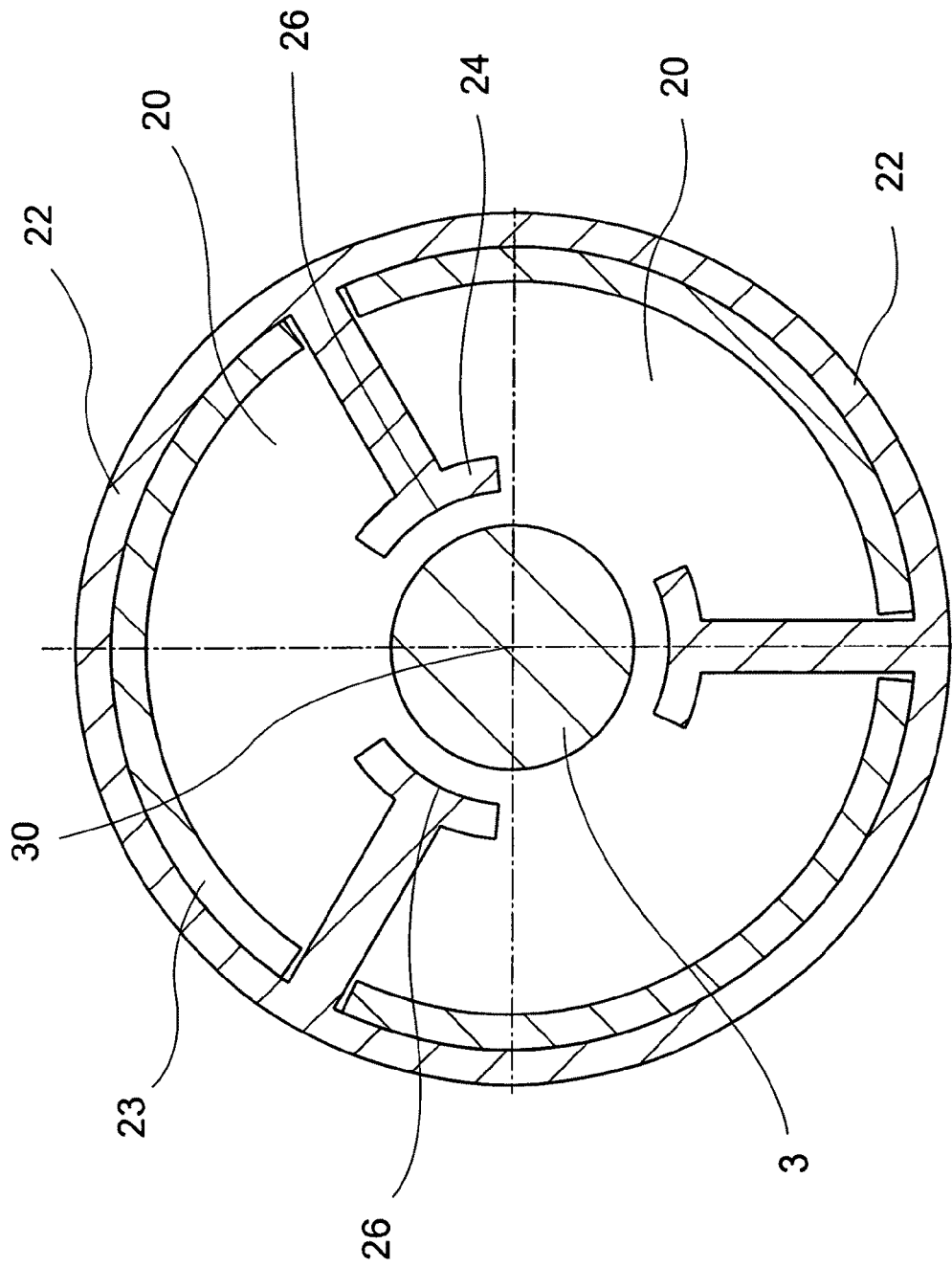
Figure 5:
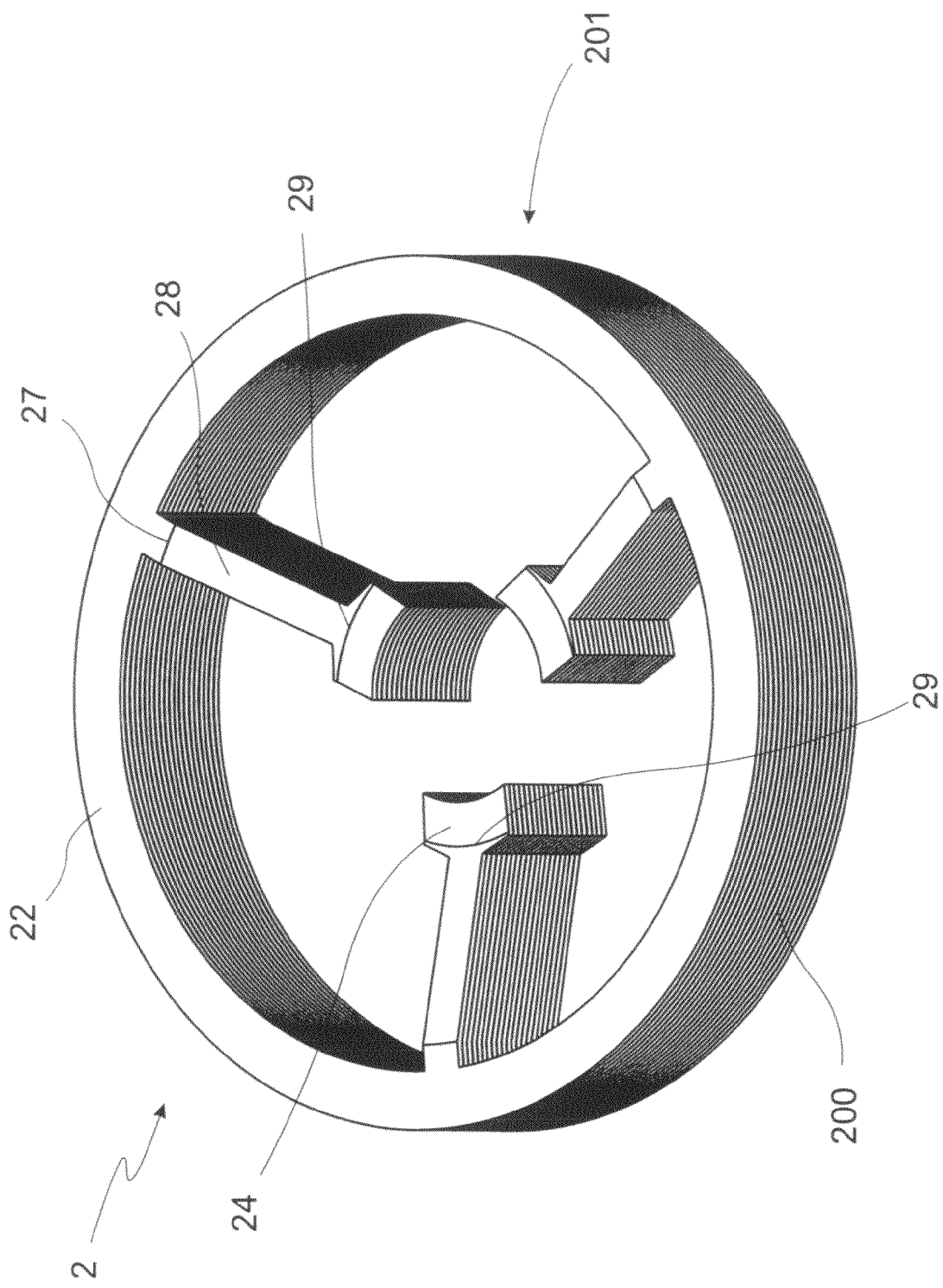
Figure 6:
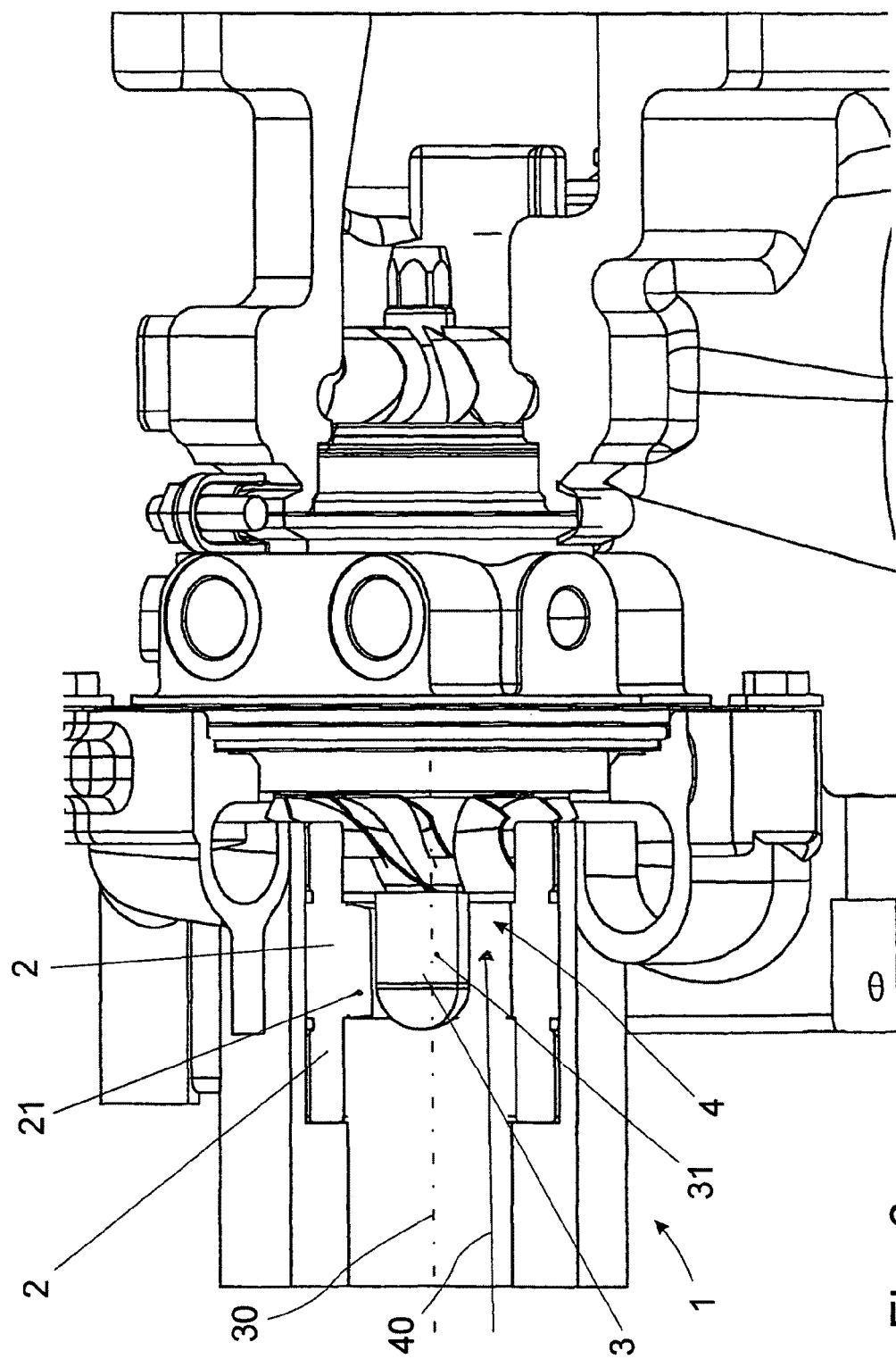
Figure 7:
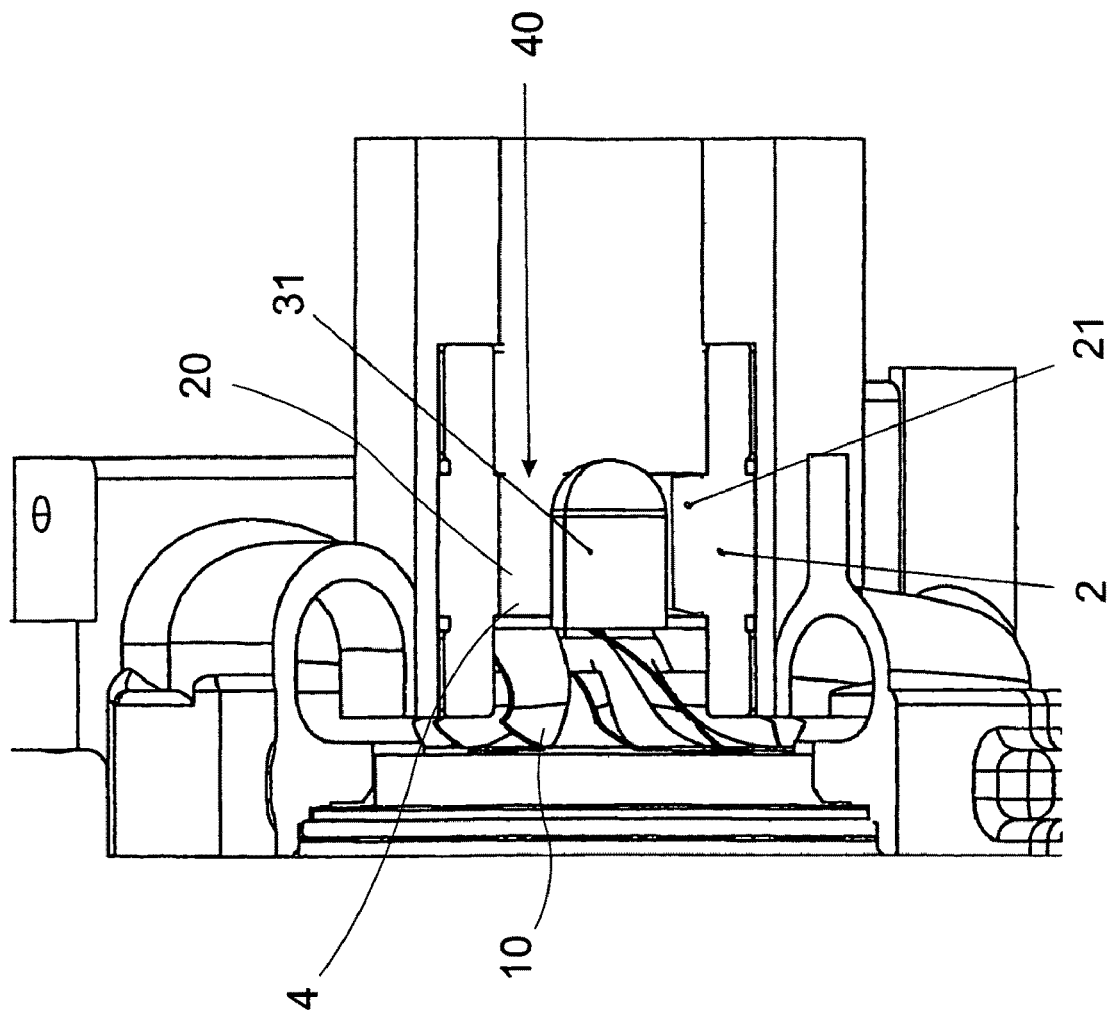

In the drawing the invention is shown schematically.
In the figures:
FIG. 1 In a top view the stator of the electromotor or generator according to the invention;
FIG. 2 in a part section or top view (in particular on the right of the drawing) an example of the electromotor or generator according to the invention;
FIG. 3 in a section in top view another example of the electromotor or generator according to the invention;
FIG. 4a in a top view another embodiment of the stator according to the invention;
FIG. 4b a side view according to FIG. 4a;
FIG. 5 in a three-dimensional view another embodiment of the stator according to the invention;
FIG. 6 the employment of the electromotor according to the invention in a turbo super-charger in a side view;
FIG. 7 in a side view the employment of the electromotor according to the invention in a centrifugal pump or compressor; and
FIG. 8 in a three-dimensional view the electromotor according to the invention.

DETAILED DESCRIPTION OF THE PREFERRED EMBODIMENT

In FIG. 1 the stator 2 of an electromotor according to the invention is shown schematically. The stator 2 is, in the example shown here, formed by a ring having at its uttermost end the stator back 22, and has on the interior side the stator grooves 20 limited by the stator teeth 21. The arrangement of the stator grooves 20 or the stator teeth 21 is regular, the single stator teeth have the same size, also the stator grooves 20 are each formed uniformly. They enclose annular or circularly the interior cross section surface 25 of the stator 2.

In the case of employment according to the state of the art the interior cross section surface 25 is filled completely by the rotor 3 not shown here so that the result is a very small air gap between rotor and stator.

In conventional employment as shown in the state of the art, then there will be no more room serving as a passage opening for conveyed media.

According to the invention it is suggested now that a part of the stator groove(s) 20 serves as medium passage opening 4.

This is achieved by the fact that not all stator grooves 20 receive a stator winding 23, but, as in the example described here, every fourth stator groove remains free and thus serves as medium passage opening 4. The magnetic qualities or the qualities of the electromotor may be slightly weakened by that, however, this can be tolerated without problems as by means of that an arrangement of the electromotor is possible directly in the medium circle without the requirement of sealing rotating shafts which is often very complicated and expensive.

The above-described concept according to the invention can now be realised in very different ways.

The stator shown in FIG. 1 has altogether 24 stator grooves arranged equidistantly on the inside of the stator where each fourth stator groove is equipped without stator winding 23 and thus forms a medium passage opening 4.

Here, on the other hand, another embodiment is shown in FIG. 2. In FIG. 2 the stator 2 has only three stator teeth 21 arranged equidistantly in a circumference distance of the angles of 120° in the stator 2.

The result is that the larger part of the cross section surface of the stator 2 is formed by three stator grooves 20. It can be discerned clearly that more than half of the interior cross section surface 25 of the stator 2 (without consideration of the cross section surface of the rotor 3) is available as medium passage opening 4. According to the invention it is provided that the cross section surface of the medium passage opening is at least 50%, in particular at least 60%, preferably at least 70% of the interior cross section surface of the stator 2. The cross section surface of the medium passage opening is here the surface rectangular to the flow direction of the medium through the electromotor or generator.

Here a part as large as possible of the interior cross section surface 25 is the aim which serves as medium passage opening 4 in order to keep the flow losses as low as possible.

The stator tooth 21 has a flange-like widening 24 on its end facing the rotor 3. This widening 24 causes a better distribution of the magnetic flow and reduces the magnetic bosh moment. The stator tooth 21 carries or limits the stator winding 23.

Another advantage of the invention is the fact that the stator tooth 21 is designed in such a way that it can serve as bearing for the rotor 3. This is also indicated schematically in FIG. 8. The front side 26 of the stator tooth 21 facing the rotor 3 is rounded flute-like and is designed, for example, as bearing, for example as pivot bearing, for the rotor 3. The remaining air gap between rotor 3 and the front side 26 is here drawn rather large it can be reduced to an absolute minimum.

The result of the embodiment shown here is that the stator grooves 20 extend across a large angle range in the circumference direction of the stator, and the stator groove area dominates the stator tooth area considerably. Thus, for example, it is provided in a modification according to the invention that the sum of the angles at circumference of the stator grooves is more than 300°, preferably even more than 330° so that the result is a very large remaining medium passage opening 4, even if in each stator groove 20 at least partly a stator winding 23 is provided.

In FIG. 2 two views are combined. The two left-hand windings are shown in section, in the area of the right-hand winding 23a the electromotor or generator according to the invention is shown in top view. This serves in particular for showing the end windings 203 which is the result when the stator winding 23 is guided around, as shown, across the stator tooth 21. The end windings 203 serves, for example, for receiving a bearing for supporting the rotor shaft 32.

The modification of the invention shown in FIG. 3 is very similar to the embodiment shown in FIG. 2. Here also only three stator teeth 21 are provided which subdivide the interior space of the stator in three rather large stator grooves 20.

Besides the slightly altered dimension and geometry—the stator teeth 21 are narrower than in the embodiment shown in FIG. 2 (the result is a larger share for the stator grooves 20)—here also the stator winding 23 is realized in another way. It is here in contact with the stator back 22 limiting the groove outside, and is in the same way fastened to it. For example, the stator winding 23 is poured in or glued on. It is therefore not absolutely necessary that the stator tooth 21 holds the stator winding 23.

In the example shown here the widening 24 serves for improving the magnetic flow as well as for reducing the bosh moment. Furthermore the widening 24 can also serve for the bearing of the rotor. It is clear that, if necessary, additional bearing elements can be built in.

On the rotor 3 in the area of the stator 2, in particular in the area of the stator winding 23 (its axial position referred to the rotational axis 30) the rotor magnet is arranged. The rotor magnet has preferably a rather high remanence and energy density, and consists preferably of rare-earth elements or alloys.

FIG. 4a and FIG. 4b show a second modification of the design of the stator.

Usually the stator 2, as it is for example employed in FIG. 2 or 3, consists of a stator sheet metal from which the groove areas are stamped out, and the stator teeth 21 are in the same level as the stator back 22.

The modification according to FIGS. 4a, 4b differs from this embodiment as follows. It is provided here that the stator tooth 21 is angled in axial direction of the rotational axis 30 of the rotor shaft 32 (not shown here). The arrangement is chosen in such a way that the stator tooth 21 extends in an sharp angle upward (see FIG. 4b) starting from a buckling line 27 in a stanchion 28 opposite the level defined by the annular stator back 22, and then runs in the upper area at a second buckling line 29 into the widening 24. The widening 24 is here arranged in a plane which is again parallel to the plane of the annular stator back 22. The arrangement is here chosen such that all stator teeth 21 drawn are bent with the same angle and run similarly at the second buckling line 29 into a widening 24 which are each situated in a common plane parallel to the plane of the stator back.

If a number of these similar stator discs 200 is stapled one above the other according to FIG. 4b the result will be a stator package 201 as it is shown schematically in FIG. 5. A number of similar stator discs 200 is here put one above the other, the area of the widening 24 being below the stator back 22. The U-bend 27 can be discerned here clearly where the stanchion 28 of the stator tooth 21 from the plane of the stator back is bent with a sharp angle downward in order to run then in the area of the widening 24 at the annular or circular buckling line 29 again into a plane parallel to the plane of the stator back 22.

Through the construction disc by disc it is possible to realized the stator 2 in any way, the single stator discs 200 are here stamped out of a plane stator metal sheet and/or shaped, that means bent.

In FIG. 6 the employment of the electromotor 1 according to the invention is shown as an example in a turbo super-charger.

The employment of the fast-reacting electromotor according to the invention in an electrically supported turbo super-charger helps considerably to improve the response characteristic of the turbo super-charger just with a low number of revolutions. It is an advantage of the electromotor according to the invention that it can be space-saving assembled exactly where a drive is needed. Therefore it is possible to realize a fast-reacting electromotor equipped with rather low, rotating masses which can be activated in a very short period of time.

The electromotor 1 is here formed by a stator 2 at the outside, a stator tooth 21 can be discerned clearly.

On the rotor 3 there is a rotor magnet 31, the rotor shaft carries the turbine wheel which has to be driven and which compresses the airflow. The medium flow in the case of gas, in particular of air, is indicated by 40, it penetrates the electromotor in the area of the medium passage opening 4 in the electromotor which is provided according to the invention in the stator grooves 20. In the area of the stator groove here the medium flow direction is orientated parallel to the rotational axis 30 of the rotor 3, and then it can, depending on the design of the medium conveying means, be deviated. The invention is suitable for radial as well as axial drive of the medium.

The concept according to the invention can be employed in an electromotor as well as also in a generator. This is a permanent magnet synchronous motor or an induction asynchronous motor.

In FIG. 7 a centrifugal pump according to the invention is shown driven by means of the electromotor according to the invention. The rotor shaft carrying the rotor 3 also carries the medium conveying part 10, for example a propeller conveyor or a conveyor wheel.

Here also the medium flow 40 is carried out at least partly if not completely through the medium passage openings 4 in the stator, in particular in the stator grooves 20.

Figure 8:
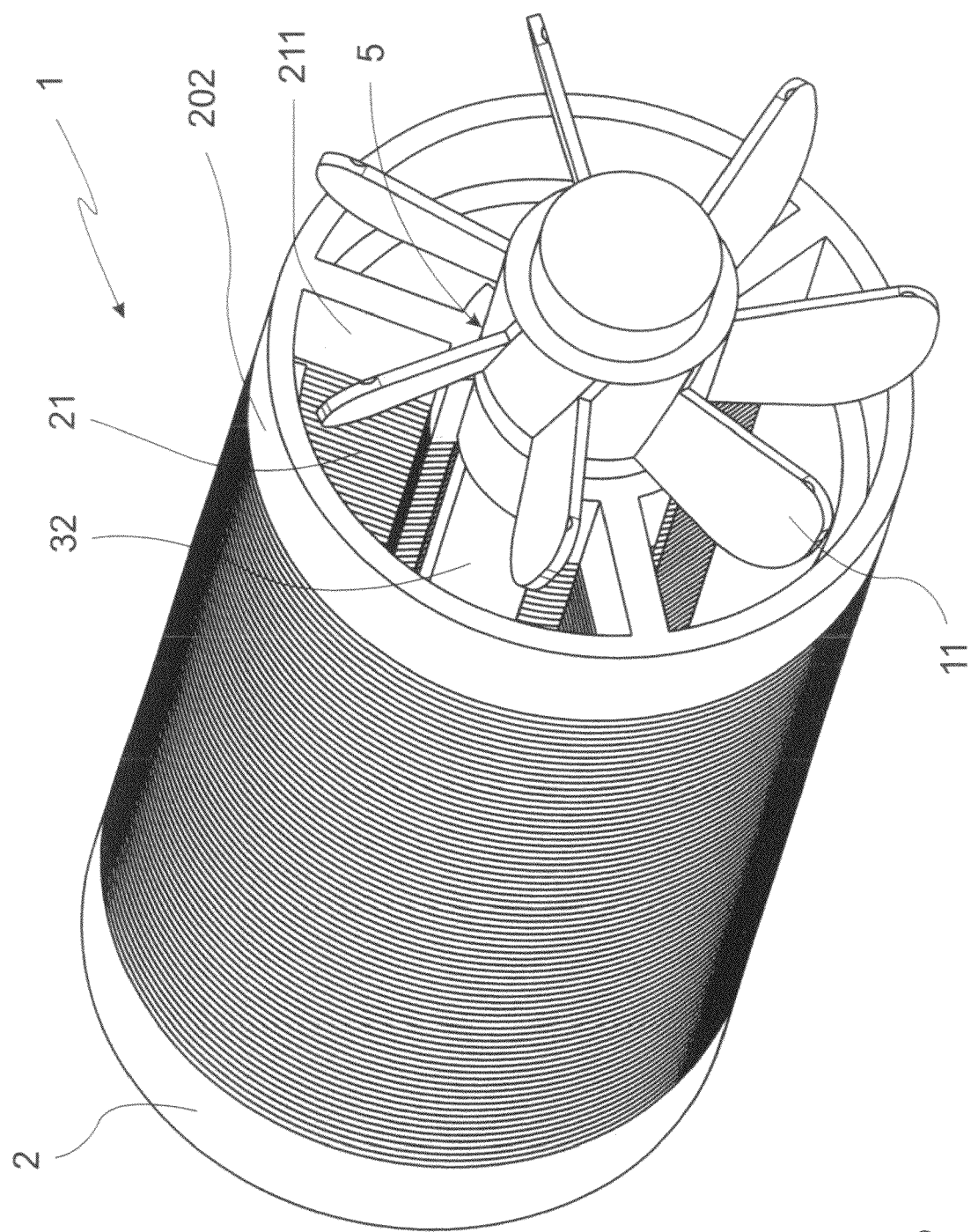

In FIG. 8 the electromotor 1 according to the invention is shown in a three-dimensional view. The stator 2 carries here three stator teeth 21 arranged equidistantly. The bearing 5 is realised in the example shown here in a geometrically identical or similar (with reference to the rotational axis 30 or the rotor shaft 32) extension 202 of the stator 2 or the stator teeth 21, the end windings or the pouring of the stator windings 23. The extension 202 shown in FIG. 8 is here annular with a certain thickness (several, about 5 to 15 stator discs 200 thick), and has also inwardly projecting teeth 211 corresponding with the stator teeth 21.

At the same time a propeller conveyor 11 is supported as conveying part (see reference number 10 in FIG. 7) on the rotor shaft 32. The medium to be conveyed, this can be a gaseous or liquid or even paste-like (in this respect this is comprised in a liquid phase), is conveyed through the rather large stator grooves 20 arranged between the stator teeth 21. It is an essential advantage of the invention that the complete electromotor is arranged in the flowing circle.

Although the invention has been described by exact examples which are illustrated in the most extensive detail, it is pointed out that this serves only for illustration, and that the invention is not necessarily limited to it because alternative embodiments and methods become clear for experts in view of the disclosure. Accordingly changes can be considered which can be made without departing from the contents of the described invention.

The invention claimed is:

1. Electromotor, for conveying gaseous and/or liquid media, or generator, the electromotor or generator being put in an area transporting the media, said electromotor or generator comprising a rotor having a rotor magnet or a short-circuit armature, and a stator surrounding the rotor, the stator having a plurality of stator grooves limited by at least one stator tooth, and at least a part of each of the stator grooves serving as an opening for the medium to be conveyed, at least a part of some of the plurality of stator grooves having a stator winding, one or more of said plurality of stator grooves being entirely serving exclusively as a medium passage opening, an end of each of the at least one stator tooth includes an inwardly facing widening, the inwardly facing widening being a bearing for the rotor.

2. Electromotor or generator according to claim 1, wherein the stator grooves of the stator have a number of the stator teeth which are divisible by three.

3. Electromotor or generator according to claim 1, wherein a sum of angles at a circumference of the stator grooves is more than 300°.

4. Electromotor or generator according to claim 1, wherein some of the stator grooves have the opening with a cross section plane of at least 50% of an interior cross section plane of the stator.

5. Electromotor or stator according to claim 1, wherein the stator is formed by a number of identical stator discs arranged one behind the other.

6. Electromotor or generator according to claim 1, wherein the stator tooth is bent in an axial direction.

7. Electromotor or generator according to claim 1, wherein a rotor shaft carrying the rotor also has a medium conveying or medium driven part.

8. Electromotor or generator according to claim 7, wherein the medium conveying or medium driven part is provided at a freely projecting part of the rotor shaft.

9. Electromotor or generator according to claim 1, further comprising an interior sheathing of the stator.

10. Electromotor or generator according to claim 1, wherein running on bearings of the rotor is provided on an, axial position within a stator winding.

11. Electromotor according to claim 1, wherein the electromotor is an asynchronous motor or a permanent magnet synchronous motor.

12. Turbo super-charger, conveying device, ventilation device or pump with an electromotor integrated herein according to claim 1.

13. Generator according to claim 1 for employment in a turbine or in devices for measuring of medium flow.

14. Turbine or device for use of medium flow with a generator according to claim 1.

15. Electromotor or generator according to claim 1, wherein a sum of angles at a circumference of the stator grooves is more than 330°.

16. Electromotor or generator according to claim 1, wherein some of the stator grooves have the opening with a cross section plane of at least 60% of an interior cross section plane of the stator.

17. Electromotor or generator according to claim 1, wherein, some of the stator grooves have the opening with a cross section, plane of at least 70% of an interior cross section plane of the stator.

* * * * *